United States Patent
Yigit et al.

(10) Patent No.: US 12,021,560 B1
(45) Date of Patent: Jun. 25, 2024

(54) APPARATUS AND METHOD FOR JOINT PROFILE-BASED SLICING OF MOBILE ACCESS AND OPTICAL BACKHAUL

(71) Applicant: Netsia, Inc., Santa Clara, CA (US)

(72) Inventors: Beytullah Yigit, Istanbul (TR); Gamze Abaka, Istanbul (TR); Seyhan Civanlar, Istanbul (TR); Burak Gorkemli, Istanbul (TR); Arda Akman, San Ramon, CA (US); Burcu Yargicoglu, Istanbul (TR)

(73) Assignee: Netsia, Inc., Santa Clara, CA (US)

( * ) Notice: Subject to any disclaimer, the term of this patent is extended or adjusted under 35 U.S.C. 154(b) by 0 days.

(21) Appl. No.: 18/164,722

(22) Filed: Feb. 6, 2023

Related U.S. Application Data

(62) Division of application No. 17/301,371, filed on Mar. 31, 2021, now Pat. No. 11,575,439, which is a
(Continued)

(51) Int. Cl.
*H04B 10/2575* (2013.01)
*G06F 9/54* (2006.01)
(Continued)

(52) U.S. Cl.
CPC ....... *H04B 10/25752* (2013.01); *G06F 9/547* (2013.01); *G06F 16/22* (2019.01);
(Continued)

(58) Field of Classification Search
CPC ......... G06F 16/22; G06F 9/547; H04B 10/27; H04B 10/25752; H04Q 11/0067; H04Q 2011/0086
(Continued)

(56) References Cited

U.S. PATENT DOCUMENTS

| 8,351,948 B2 | 1/2013 | Kokku et al. |
| 8,660,071 B2 | 2/2014 | Borran et al. |

(Continued)

FOREIGN PATENT DOCUMENTS

| WO | WO-2016137491 A1 * | 9/2016 | ............. H04L 41/00 |
| WO | WO-2019116076 A1 * | 6/2019 | ......... H04L 12/2867 |

OTHER PUBLICATIONS

TR-348 et al; Hybrid Access Broadband Network Architecture; 2016; TR-348 Hybrid Access Broadband Network Architecture; pp. 1-49. (Year: 2016).*

(Continued)

*Primary Examiner* — Amritbir K Sandhu
(74) *Attorney, Agent, or Firm* — Shumaker & Sieffert, P.A.

(57) ABSTRACT

Software Defined Networking concepts apply to access, fronthaul, backhaul and core networks of 5G mobile networks and beyond. Such network components currently have individual/segmented control planes and associated controllers to provide configurability, provisioning, and network slicing. This is because of technology disparity between these network components: access is wireless/cellular, backhaul and fronthaul are optical/fiber, and core is electrical/wire-line. A system/method is detailed that enables a coordinated and unified end-to-end slicing, wherein the coordination is provided in the system/method that (a) attaches to the respective controllers of these network components in real-time, (b) collects the connectivity topology of each network segment as the network evolves, (c) passes the slice-profile information (translating according to capabilities of that network segment to configure an end-to-end slice with a specified bandwidth requirement and service quality level), and (d) passes across a VLAN tag to be used across network segments to associate with the same slice.

19 Claims, 10 Drawing Sheets

Related U.S. Application Data division of application No. 16/378,036, filed on Apr. 8, 2019, now Pat. No. 10,992,385.

(51) Int. Cl.
   *G06F 16/22* (2019.01)
   *H04B 10/27* (2013.01)
   *H04Q 11/00* (2006.01)

(52) U.S. Cl.
   CPC ......... *H04B 10/27* (2013.01); *H04Q 11/0067* (2013.01); *H04Q 2011/0086* (2013.01)

(58) Field of Classification Search
   USPC ....................................................... 398/115
   See application file for complete search history.

(56) References Cited

U.S. PATENT DOCUMENTS

| | | | |
|---|---|---|---|
| 8,874,125 | B2 | 10/2014 | Mahindra et al. |
| 10,142,094 | B2 | 11/2018 | Liu et al. |
| 10,327,152 | B2 | 6/2019 | Sunay et al. |
| 10,623,129 | B2 | 4/2020 | Effenberger et al. |
| 10,797,934 | B1 | 10/2020 | Akman et al. |
| 10,992,385 | B2 | 4/2021 | Yigit et al. |
| 11,184,843 | B2 | 11/2021 | Akman et al. |
| 11,575,439 | B1 | 2/2023 | Yigit et al. |
| 2007/0253432 | A1* | 11/2007 | Regale .................. H04L 12/465 |
| | | | 370/395.53 |
| 2012/0243871 | A1 | 9/2012 | Huang et al. |
| 2013/0051226 | A1 | 2/2013 | Elefant et al. |
| 2013/0072222 | A1* | 3/2013 | Weill ..................... H04W 64/00 |
| | | | 455/456.1 |
| 2013/0170353 | A1 | 7/2013 | Liu |
| 2015/0117861 | A1 | 4/2015 | Ponzini et al. |
| 2016/0072708 | A1 | 3/2016 | Field |
| 2016/0157274 | A1 | 6/2016 | Akiyoshi |
| 2017/0063486 | A1 | 3/2017 | Sarashina |
| 2017/0118081 | A1* | 4/2017 | Rius I Riu .......... H04L 41/0893 |
| 2017/0126320 | A1* | 5/2017 | Cho ................. H04B 10/25754 |
| 2018/0076914 | A1 | 3/2018 | Zhou et al. |
| 2018/0212748 | A1 | 7/2018 | Liu et al. |
| 2019/0089478 | A1* | 3/2019 | Effenberger ........ H04J 14/0267 |
| 2019/0089623 | A1* | 3/2019 | Dion ................... H04N 21/6118 |
| 2019/0182712 | A1 | 6/2019 | Watanabe et al. |
| 2019/0274086 | A1 | 9/2019 | Cui et al. |
| 2019/0342874 | A1 | 11/2019 | Davydov et al. |
| 2020/0014992 | A1* | 1/2020 | Chung ............... H04Q 11/0067 |
| 2020/0015293 | A1 | 1/2020 | Wang et al. |
| 2020/0044930 | A1 | 2/2020 | Stafford et al. |
| 2020/0076528 | A1 | 3/2020 | Cavaliere et al. |
| 2020/0137623 | A1 | 4/2020 | Nirwani et al. |
| 2020/0205231 | A1 | 7/2020 | Trojer et al. |
| 2020/0213052 | A1 | 7/2020 | Li et al. |
| 2020/0267623 | A1 | 8/2020 | Altay et al. |
| 2020/0322052 | A1* | 10/2020 | Yigit ...................... H04B 10/27 |
| 2021/0051108 | A1* | 2/2021 | Akman ............... H04L 41/0896 |
| 2021/0105861 | A1 | 4/2021 | Akman et al. |
| 2021/0160768 | A1 | 5/2021 | Akman et al. |
| 2021/0185601 | A1 | 6/2021 | Altay et al. |
| 2022/0124029 | A1* | 4/2022 | Finkelstein ........... H04L 69/323 |

OTHER PUBLICATIONS

Liu et al; MPTCP Tunnel: An Architecture for Aggregating Bandwidth of Heterogeneous Access Networks; 2018; Wiley; pp. 1-12. (Year: 2018).*

Liu et al; MPTCP Tunnel : An Architecture for Aggregating Bandwidth of Heterogeneous Access networks; 2018; pp. 1-12. (Year: 2018).*

Bhattacharjee et al., "Network Slicing for TSN-Based Transport Networks", IEEE Access, vol. 9, IEEE, Apr. 2021, pp. 1-22.

Chang et al., "5G Programmable Infrastructure Converging disaggregated network and compute Resources", European Commission, Nov. 2018, pp. 1-104.

Lida et al; Dynamic TWDM-PON for Mobile Radio Access Networks; Optical Society of America; Oct. 2013. (Year: 2013) 10 pp.

Mikaeil et al; Performance Evaluation of XG-PON Based mobile Front-haul transport in Cloud-RAN Architecture; J. Opt. Commun. Netw.Nol. 9, Nov. 2017, pp. 984-994 (Year: 2017).

Prosecution History for U.S. Appl. No. 16/378,036, dated Apr. 14, 2020 to Mar. 30, 2021, 49 pp.

Prosecution History from U.S. Appl. No. 17/301,371, dated Apr. 20, 2022 through Jan. 4, 2023, 38 pp.

* cited by examiner

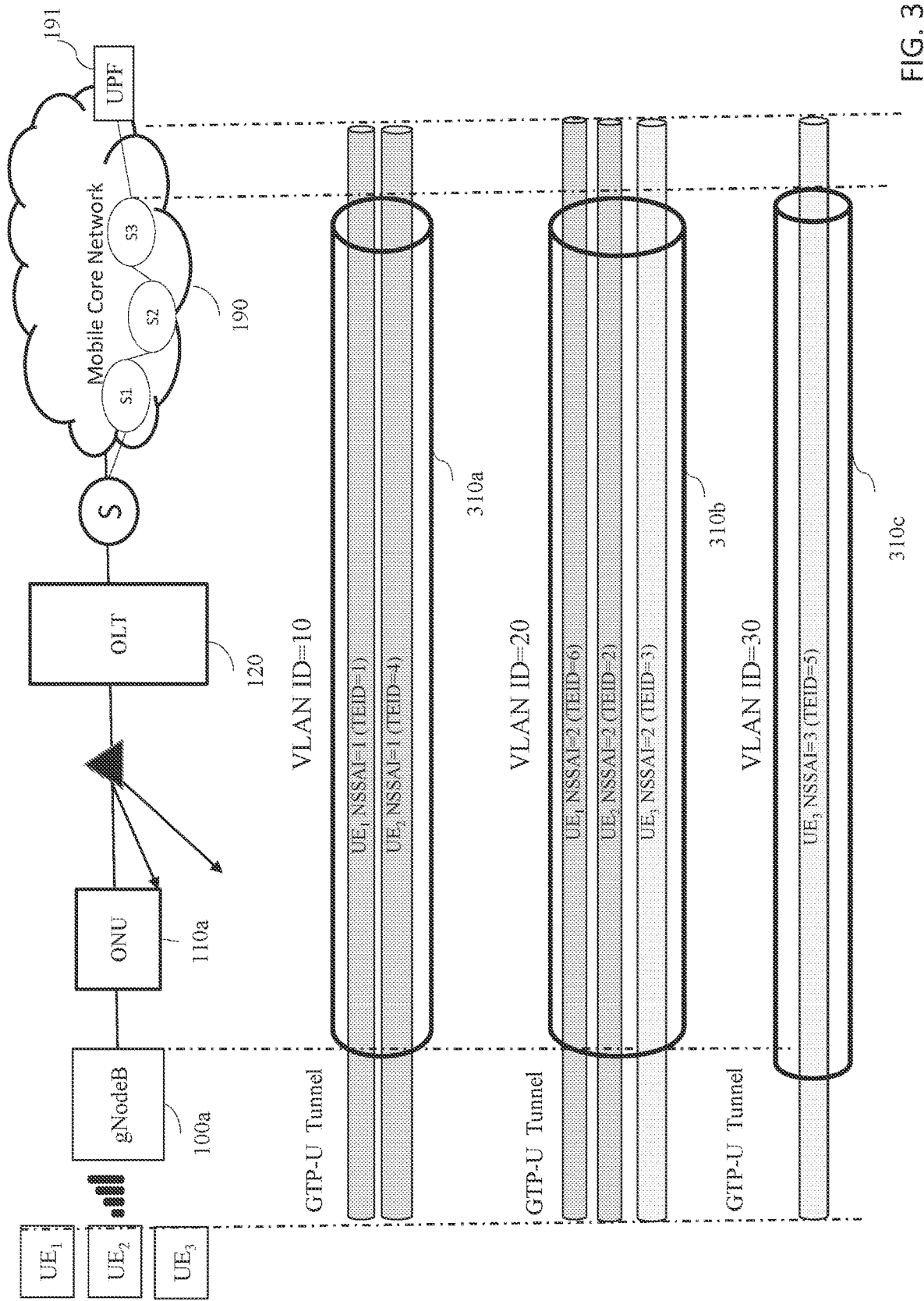

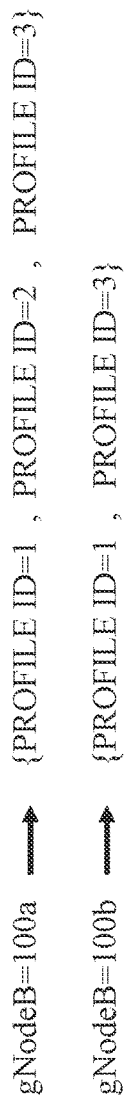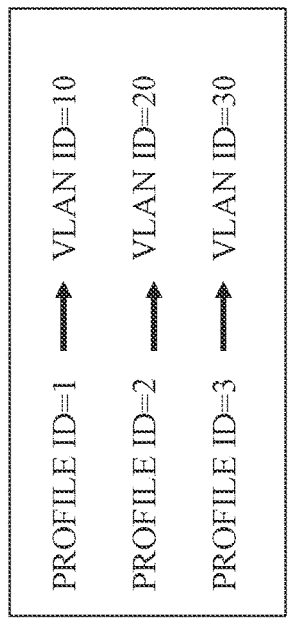
FIG. 4A

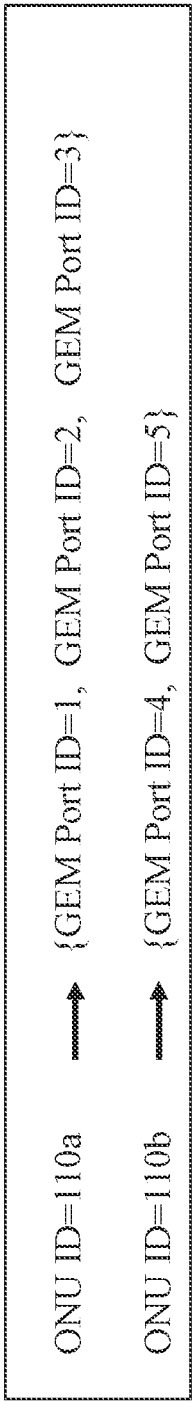
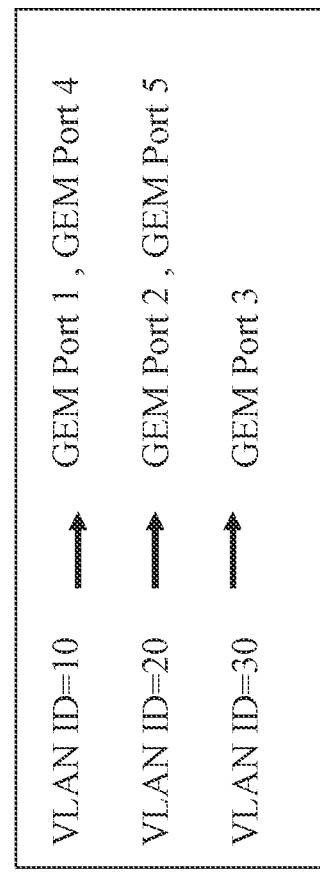
FIG. 4B

APPARATUS AND METHOD FOR JOINT PROFILE-BASED SLICING OF MOBILE ACCESS AND OPTICAL BACKHAUL

CROSS REFERENCE

This application is a divisional of U.S. patent application Ser. No. 17/301,371, filed 31 Mar. 2021, which is a divisional of U.S. patent application Ser. No. 16/378,036, filed 8 Apr. 2019, the entire content of each application is incorporated herein by reference.

BACKGROUND OF THE INVENTION

Field of Invention

The present invention relates generally to the field of mobile networks. More specifically, the present invention is related to a system and method for providing a profile-based slicing of a $5^{th}$ generation (and beyond) cellular network's access, backhaul and fronthaul components comprising a radio access network (RAN) and a passive optical network (PON).

Discussion of Related Art

Any discussion of the prior art throughout the specification should in no way be considered as an admission that such prior art is widely known or forms part of common general knowledge in the field.

3GPP designed a sliceable 5th generation mobile network infrastructure to provide many logical network segments over a common single physical network (see TR 28.801). Technologies such as software defined networking (SDN) and network function virtualization (NFV) are the key enablers for breaking up traditional network structures into such customizable components that can be stitched together using software to provide the right level of connectivity, with each element running on a virtual architecture of its own choice. One of the primary technical challenges facing service providers is being able to deliver the wide variety of network performance characteristics that future services will demand. Such performance characteristics are bandwidth, latency, packet loss, security, reliability—all of which will greatly vary from one service to the other. Emerging applications such as remote operation of robots, massive IOT, and self-driving cars require connectivity, but with vastly different characteristics. New technologies such as virtualization, network programmability and network slicing enable logical networks that are customized to meet the quality of service (QoS) needs of each application.

Network slicing also provides a way to segment the network to support particular types of services or businesses or even to host other service providers who do not own a physical network. Each slice can be optimized according to capacity, coverage, connectivity and performance characteristics. Furthermore, since the slices are isolated from each other both in the control and user planes, the user experience of the network slice will be the same as if it was a physically separate network.

The evolving mobile network is comprised of the 'access network' and the 'core network'. The core network relies on SDN and NFV, wherein all control and user plane network functions are separated, virtualized and completely distributed. The access network is formed by the radio access network (RAN) comprised of base stations connected to the core network infrastructure through a passive optical network (PON) backhaul that is chosen because of being highly economical. The high bitrate and coverage requirements of 5G have been achieved by denser deployment of small cells or Remote Radio Heads (RRH). These small units are deployed anywhere with potentially high traffic requirements to satisfy the need. A BaseBand Unit (BBU) is deployed to manage a group of RRHs, each RRH connecting to a BBU forming the so-called 'fronthaul'. Just like backhaul, fronthaul is expected to be using PON.

According to prior art, SDN concepts apply to the access, fronthaul, backhaul and core. Meaning, they all have individual control planes to provide configurability, provisioning and network management, but it is segmented and disconnected from one another primarily due to technology disparity. From technology perspective, the access is wireless/cellular, backhaul and fronthaul are optical/fiber, and core is electrical/wireline. A coordinated end-to-end slicing including RAN, PON and core network has not been addressed to date. The delivery methods of a slice that correspond the same level quality of service are different across these three segments. For example, while cellular access must account for the high mobility of users, and thus frequent adjustment of slice parameters across many base stations, the passive optical network has high capacity but not frequently configurable by design.

Standardization efforts have gone into defining specific slices and their requirements based on application/service. For example, the user equipment (UE) can now directly specify its desired slice using a new field called Network Slice Selection Assistance ID (NSSAI) in the packet header. A subfield of NSSAI is Slice/Service Types (SST) that is used to indicate the slice type. The standards already defined most commonly usable network slices and the corresponding standardized SST values in ETSI document TS 23.501. For example, SST values of 1, 2 and 3 correspond to slice types of enhanced Mobile Broadband (eMBB), ultra-reliable and low-latency communications (uRLLC) and massive IoT (MIoT), respectively. These services reflect the most commonly planned new services. The network slice selection instance for a UE is normally triggered as part of the initial registration procedure. The Access and Mobility Management Function (AMF) of the core network retrieves the slices that are allowed by the user's subscription and interacts with the Network Slice Selection Function (NSSF) of the core network to select the appropriate network slice instance for that traffic on the RAN.

A service provider can offer the Network Slice as a Service (NSaaS) to another service provider in the form of a virtual telecommunications service. NSaaS allows the tenant provider to use the network slice instance just like an end user, or optionally allows the tenant provider to manage the specific network slice instance via a network management exposure interface. In turn, the tenant provider may use the slice by further slicing it to offer its own communication services family. A public safety network provider, for example, can be a tenant of a mobile operator's network and request a slice that has high security and high reliability.

SUMMARY OF THE INVENTION

Each network slice must be stitched from an access (RAN) slice, a backhaul/fronthaul PON slice as well as the corresponding core network slice, and must be characterized using a 'Profile' according to this invention, wherein exemplary attributes of a Profile are:

1. Application type (i.e., voice, video, gaming etc.)
2. Bandwidth (upstream and downstream)

3. End-to-end packet latency
4. Reliability/Availability
5. Packet loss
6. Security (encryption)
7. Charging type
8. User Equipment type
9. Traffic priority
10. Service Function Chain (SFC) on data path
11. Traffic policies (such as security or routing policies)

An exemplary slice is a highly secure, highly reliable and with high priority, which requires (a) traffic encryption, (b) multiple disjoint parallel traffic routes for improved reliability against facilities failures, and (c) high priority treatment against other traffic. The challenge is to map a user's traffic to one of these slices.

The embodiments described here enable specifically the radio access, backhaul and fronthaul components of the mobile network to provide a seamless slice with the same 'Profile'. A new profile is added to the RAN and PON, or updated as the users move around, or as new network components such as base stations, or PON components are added to the network or removed from the network, or as new services and applications are defined. A key aspect of the invention is to group cellular users' traffic together using the same layer 2 protocol (e.g., VLAN tag) as an identifier in such a way that the specific traffic stream receives same/similar treatment without being in any way tied into the specific layer 1 (physical layer) technology used to deliver it. Given neither RAN nor PON fully support layer 3 (routing layer) protocols, the only way to create a common denominator is to use layer 2. As a result, this method obfuscates whether it is cellular, wireless, optical, electrical, time division multiplexing (TDM) or wavelength division multiplexing (WDM) that is used at the physical layer. By using the system and method according to this invention, the control plane applications of RAN and PON are loosely integrated and mediated so that access, backhaul and fronthaul connectivity, bandwidth and QoS are translated across networks using a common 'profile' creating a consistent view of the overall access, and thereby delivering the same level of service quality. The system and method of invention can further be extended to integrate into the control layer of profile based slicing of the core network.

Embodiments of the present invention are an improvement over prior art systems and methods.

In one embodiment, the present invention provides a method to coordinate assignment of total upstream and downstream bandwidths in a mobile network, the mobile network comprising a radio access network (RAN) and a passive optical network (PON), the RAN comprising a RAN controller, a plurality of base stations (BSs) configured by the RAN controller, the PON comprising a PON controller, a plurality of Optical Networking Units (ONUs), and at least one optical line termination (OLT) unit, each ONU attached to a BS within the plurality of BSs in the RAN and the OLT in the PON, the ONUs and the OLT both configured by the PON controller, the method comprising the steps of: (a) identifying, at the RAN controller, total upstream and downstream bandwidth information for all user connections in each BS within the plurality of BSs in the RAN; (b) receiving the identified information of (a) from the RAN controller, and mapping, at a system attached to both the RAN controller and the PON controller of the mobile network, each BS to its attached ONU; (c) sending a message to the PON controller, the message comprising a configuration request for total upstream and downstream bandwidths on ONUs identified in the information of (a), and wherein, based on the message in (c), the PON controller configuring the bandwidths onto upstream and downstream connections associated with ONU in the PON that is attached to the BS in the RAN, and wherein the message being translated to be compatible with an interface associated with the PON controller.

In another embodiment, the present invention provides a method to coordinate assignment of two different profiles across a mobile network, the mobile network comprising a radio access network (RAN) and a passive optical network (PON), the RAN comprising a RAN controller, a plurality of base stations (BSs) configured by the RAN controller, the PON comprising a PON controller, a plurality of Optical Networking Unit (ONUs), and at least one optical line termination (OLT) unit, each ONU attached to a BS within the plurality of BSs in the RAN and the OLT in the PON, the ONUs and the OLT both configured by the PON controller, the method as implemented in the RAN controller comprising the steps of: (a) receiving a first message at the RAN controller, the first message comprising: (i) a first profile information and associated first set of one or more VLAN tags, and (ii) a second profile information and associated second set of one or more VLAN tags; (b) sending to a BS within the plurality of BSs in the RAN: (i) the first profile data, (ii) the first set of one or more VLAN tags, (iii) the second profile data, and (iv) the second set of one or more VLAN tags, wherein the BS maps a first group of GTP-U tunnels corresponding to the first profile to VLANs with the first set of one or more VLAN tags, and the BS maps a second group of GTP-U tunnels corresponding to the second profile to VLANs with the second set of one or more VLAN tags; (c) sending a second message to the PON controller, the second message comprising the first profile data, the first set of one or more VLAN tags, the second profile data, and the second set of one or more VLAN tags, wherein a system attached to both the RAN controller and the PON controller of the mobile network determines corresponding ONU and OLT configuration parameters, and sends a third message to the PON controller containing the ONU and OLT configuration parameters; (d) the PON controller configuring: (i) the first profile data, (ii) the first set of one or more VLAN tags, (iii) the second profile data, and (iv) the second set of one or more VLAN tags and corresponding PON configuration parameters into the OLT and the ONUs.

In yet another embodiment, the present invention provides an article of manufacture comprising non-transitory computer storage medium storing computer readable program code which, when executed by a processor implements a method to coordinate assignment of total upstream and downstream bandwidths in a mobile network, the mobile network comprising a radio access network (RAN) and a passive optical network (PON), the RAN comprising a RAN controller, a plurality of base stations (BSs) configured by the RAN controller, the PON comprising a PON controller, a plurality of Optical Networking Units (ONUs), and at least one optical line termination (OLT) unit, each ONU attached to a BS within the plurality of BSs in the RAN and the OLT in the PON, the ONUs and the OLT both configured by the PON controller, the non-transitory computer storage medium comprising: (a) computer readable program code identifying, at the RAN controller, total upstream and downstream bandwidth information for all user connections in each BS within the plurality of BSs in the RAN; (b) computer readable program code receiving the identified information of (a) from the RAN controller, and mapping, at a system attached to both the RAN controller and the PON controller of the mobile network, each BS to its attached ONU; (c) computer readable program code sending a message to the PON controller, the message comprising a configuration request for total upstream and downstream bandwidths on ONUs identified in the information of (a), and wherein, based on the message in (c), the PON controller configuring the bandwidths onto upstream and downstream connections associated with ONU in the PON that is attached to the BS in the RAN, and wherein the message being translated to be compatible with an interface associated with the PON controller.

In yet another embodiment, the present invention provides an article of manufacture comprising non-transitory computer storage medium storing computer readable program code which, when executed by a processor implements a method to coordinate assignment of two different profiles across a mobile network, the mobile network comprising a radio access network (RAN) and a passive optical network (PON), the RAN comprising a RAN controller, a plurality of base stations (BSs) configured by the RAN controller, the PON comprising a PON controller, a plurality of Optical Networking Unit (ONUs), and at least one optical line termination (OLT) unit, each ONU attached to a BS within the plurality of BSs in the RAN and the OLT in the PON, the ONUs and the OLT both configured by the PON controller, the non-transitory computer storage medium comprising: (a) computer readable program code receiving a first message at the RAN controller, the first message comprising: (i) a first profile information and associated first set of one or more VLAN tags, and (ii) a second profile information and associated second set of one or more VLAN tags; (b) computer readable program code sending to a BS within the plurality of BSs in the RAN: (i) the first profile data, (ii) the first set of one or more VLAN tags, (iii) the second profile data, and (iv) the second set of one or more VLAN tags, wherein the BS maps a first group of GTP-U tunnels corresponding to the first profile to VLANs with the first set of one or more VLAN tags, and the BS maps a second group of GTP-U tunnels corresponding to the second profile to VLANs with the second set of one or more VLAN tags; (c) computer readable program code sending a second message to the PON controller, the second message comprising the first profile data, the first set of one or more VLAN tags, the second profile data, and the second set of one or more VLAN tags, wherein a system attached to both the RAN controller and the PON controller of the mobile network determines corresponding ONU and OLT configuration parameters, and sends a third message to the PON controller containing the ONU and OLT configuration parameters; (d) computer readable program code in the PON controller configuring: (i) the first profile data, (ii) the first set of one or more VLAN tags, (iii) the second profile data, and (iv) the second set of one or more VLAN tags and corresponding PON configuration parameters into the OLT and the ONUs.

In another embodiment, the present invention provides a system attached to both Radio Access Network (RAN) controller and Passive Optical Network (PON) controller of a mobile network, the RAN controller and the PON controller, the RAN controller configuring a plurality of base stations (BS) forming the access subnetwork, and the PON controller configuring a plurality of Optical Networking Units (ONUs) and Optical Line Termination Units (OLT)s forming the backhaul subnetwork, wherein each ONU is attached to a base station and to an OLT, the system comprising: (a) a database storing (i) topology information associated with connectivity of access subnetwork and backhaul subnetwork components, the topology information associated with connectivity of access subnetwork and backhaul subnetwork components retrieved from the RAN controller and the PON controller, respectively, (ii) profile information of a plurality of profiles including their attributes and assigned profile IDs retrieved from the RAN controller, and (iii) the profile information's mapping onto backhaul subnetwork configuration parameters; (b) a connectivity tracker function to track in real-time the topology information between the access and backhaul subnetwork components; (c) a mapping function translating profile information retrieved from the RAN controller to corresponding backhaul subnetwork configuration parameters; and (d) an interface function that communicates with both the RAN controller and the PON controller using their respective Application Programming Interfaces (APIs).

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 3 illustrates the mapping of GTP-U tunnels into VLANs according to the present invention.

FIG. 4A illustrates data mapping between profiles and VLANs to RAN according to the present invention.

FIG. 4B illustrates data mapping between profiles and VLANs to PON according to the present invention.

DESCRIPTION OF THE PREFERRED EMBODIMENTS

Figure 1:
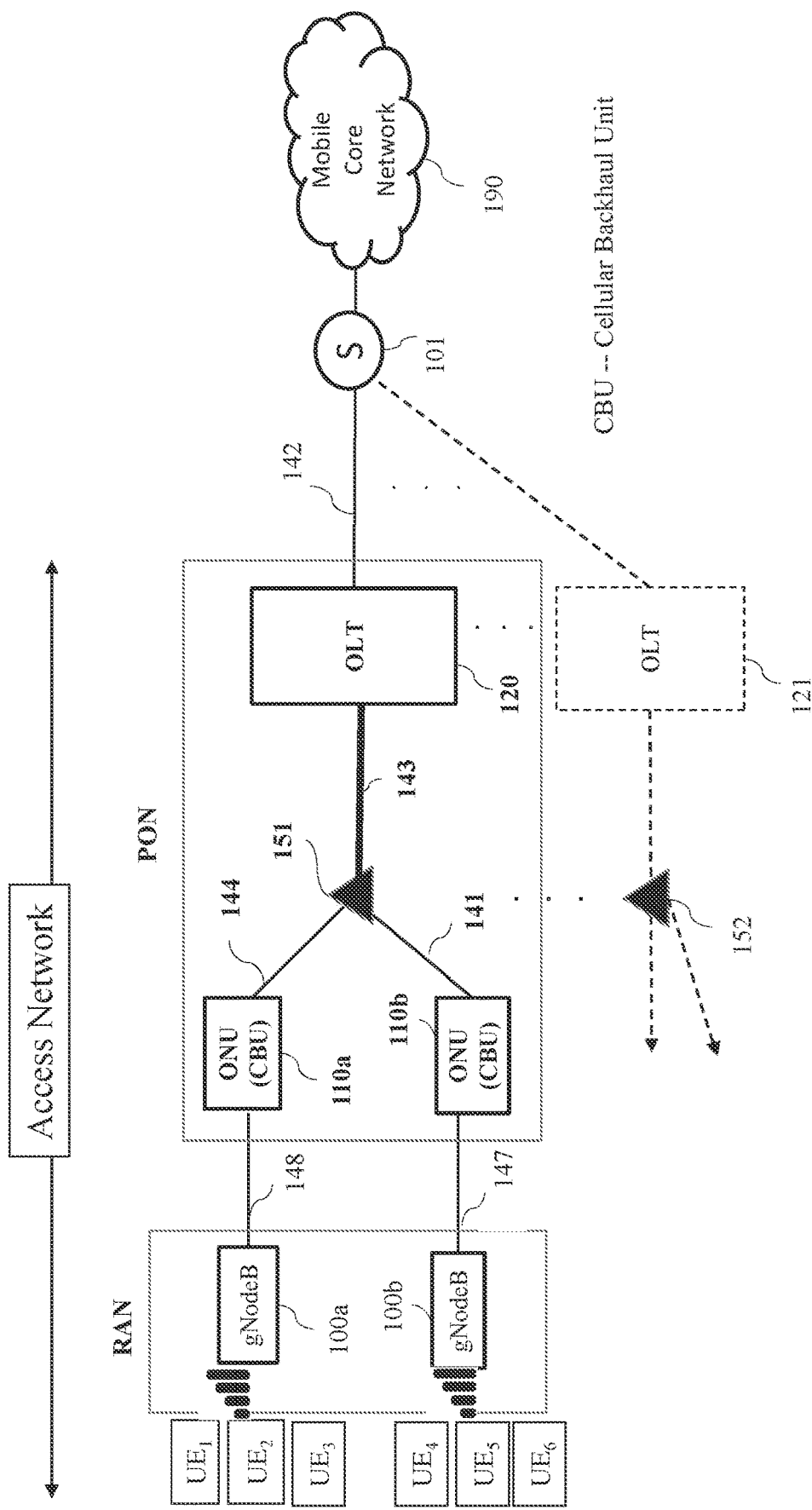
FIG. 1 illustrates the access network of a $5^{th}$ generation mobile network (prior art).

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, router, switch, gateway, hardware platform, controller etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, switch, router, controller, optical line termination, optical splitter, optical network unit, gateway or host is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video). User Equipment (UE) is generally a mobile device such as a cellular phone, or a sensor, or another type of equipment that wirelessly connects to the mobile network.

Any physical device in the network is generally identified by its type, ID/name, Medium Access Control (MAC) address, and Internet Protocol (IP) address. The 5th generation mobile networks rely on software defined networking (SDN) wherein the controller of the SDN can run on a single server or may be distributed on several servers. At any point in time, one controller may be the master while others are slaves. Alternatively, the plurality of controllers may be in a peer mode. The controller may be attached to each base station, switch or router in the network.

Note that while the illustrated examples in the specification discuss mainly 5G networks relying on SDN (as Internet Engineering Task Force [IETF] and Open Networking Forum [ONF] define), and NFV (as European Telecommunications Standards Institute (ETSI) define), embodiments of the invention may also be applicable in other kinds of network (mobile and non-mobile) that widely use GTP-U tunnels and SDN networks.

For simplified terminology in the following descriptions, the term 'access network' is used to include both RAN and backhaul or fronthaul PON components. FIG. 1 is a simple access network of a 5th generation mobile network comprising (a) User Equipment 1, 2, . . . , 6, wherein UE 1, 2 and 3 are attached to base station (gNodeB) 100a, and UE 4, 5 and 6 are attached to base station (gNodeB) 100b, forming a simple Radio Access Network (RAN), (b) Optical Network Unit (ONU) 110a, attached to gNodeB 100a via link 148, and ONU 110b, attached to gNodeB 100b via link 147, wherein both connections 147 and 148 are electrical, such as twisted-pair or coaxial cable, (c) Optical Line Termination (OLT) 120 attached to ONU 110a and 110b via an Optical Distribution Network (ODN) mainly comprising Passive Optical Splitter 151, and optical fiber links 141, 143 and 144. Passive Optical Splitter 151 basically splits fiber feed 143 into each fiber drop (strand) 141 and 144 towards the ONUs.

There may be up to 8, 32 or 64 ONUs attached to each OLT, depending on the size of OLT implementation. ONU converts optical signals transmitted via fiber to electrical signals, and vice versa. In the upstream direction, UE sends data via cellular signals to eNodeB, which in turn converts them into electrical signals and sends them to its attached ONU, which in turn converts them into optical signals and sends them to the upstream OLT, which in turn converts them back to electric signals and sends them to aggregation switch 101. The traffic from many OLTs in a geographical area is gathered at switch 101 and then routed towards the core network 190, which comprises a routed network on which core network functions are scattered as virtualized network functions.

Each ONU aggregates and grooms different types of data coming from each eNodeB and sends them to the upstream OLT. Grooming is the process that optimizes and reorganizes the data stream so it would be delivered more efficiently. OLT supports a dynamic bandwidth allocation (DBA) algorithm (and sometimes implements more than one algorithm) that supports fair distribution of upstream and downstream fiber capacity amongst multiple ONUs to support traffic that comes in bursts from the UEs. The OLT, its attached ONUs and the ODN form a Passive Optical Network (PON). There are various types of PONs known in prior art such as Gigabit PON (GPON), Ethernet PON (EPON) and ATM PON (APON) depending on the capabilities and layer 2 protocols supported. A typical PON operates at layers 1 and 2 of OSI, but may also perform some limited layer 3 functions such as IP header lookup and processing.

Figure 2:
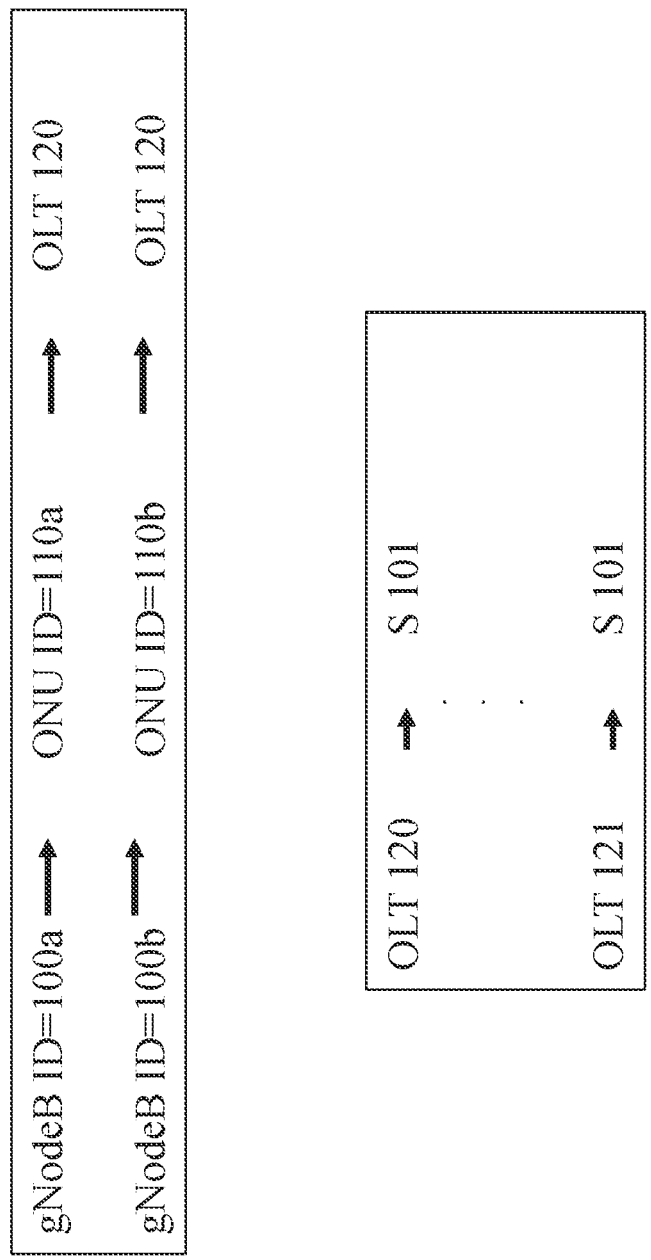
FIG. 2 illustrates data mapping between access network components (prior art).

The mappings between RAN components and the corresponding PON components of the access network are illustrated in FIG. 2. The RAN components are identified by the ID of base stations (gNodeB). Each gNodeB has a unique ID assigned manually or by its control/management system. Correspondingly, an ONU ID identifies each ONU. The ID corresponding to the ONU is uniquely assigned by its upstream OLT. Each OLT has a unique ID as well, assigned to it manually or by the control/management system of a group of OLTs. A group of OLTs are attached to an aggregation switch. These mappings are used in the database schema of system of invention.

Traffic Container (T-CONT) is traffic bearing object within an ONU that represents a group of logical connections, and is treated as a single entity for the purpose of upstream bandwidth assignment on the PON. In the upstream direction, it is used to bear the service traffic. Typically, each T-CONT corresponds to one bandwidth type. Each bandwidth type has its own QoS features. Each T-CONT is identified by the ALLOC_ID uniquely, allocated by OLT i.e. a T-CONT can only be used by one ONU per PON interface on the OLT.

The GPON Encapsulation Method (GEM) port is a virtual port for performing so-called GEM encapsulation for transmitting frames between OLT and ONU in a GEM channel. Each different traffic class (TC) is assigned a different GEM Port ID. A T-CONT consists of one or more GEM Ports. Each GEM port bears one kind of service traffic. The GEM Port ID is uniquely allocated by the OLT. Between the ONU and OLT layer 2 frames are carried over it through the GEM frames identified by GEM Port IDs. Each GEM Port ID is unique per OLT and represents a specific traffic or group of flows between OLT and ONU. GEM channels are used to transmit both upstream traffic, which is from ONU to OLT, and to transmit downstream traffic, which is always broadcast traffic from OLT towards all ONUs. Each ONU identifies traffic destined to it based on the matching GEM Port ID in the received GEM frames. In summary, GEM Ports are used to differentiate among different traffic classes (TCs).

FIG. 3 traces traffic from UE 1, 2 and 3 via gNodeB 100*a*, ONU 110*a*, OLT 120, S 101, and core network switches S1, S2 and S3 towards User Plane Function (UPF) 191. The origination is a UE and the destination is the UPF at the core network. Each UE's traffic is placed within a GTP-U tunnel according to standards. There is one GPRS Tunneling Protocol GTP-U tunnel per UE and per bearer (service type) as illustrated in the picture. GTP-U protocol is defined by 3GPP to carry packetized radio service within 3G, LTE and 5G core networks. One GTP tunnel is established per user equipment, per bearer per QoS (UE/bearer/QoS) and per traffic direction along an interface between any pair of 5G network functions. Two GTP tunnels (one for uplink and one for downlink) are established between base station (eNodeB) and the UPF. The eNodeB receives IP packets from the user equipment that is attached to the radio network and destined to a data network (such as the Internet), wraps them into the GTP tunnel payload, which has a source IP address of that eNodeB, and destination IP address of the UPF.

GTP comprises the following protocols: GTP-C, which performs signaling across the core network to activate and deactivate GTP tunnels, and GTP-U, which transports user data between core network functions, and between the Radio Access Network (RAN) and the core network functions. GTP-U supports both IPv4 and IPv6 protocols in its payload. GTP-U tunneling protocol stack, header format and messages are all well known in prior art (see ETSI's 3GPP TS 29.281), and therefore not detailed here. Furthermore, the architectural components of both LTE and 5G core networks are detailed in various ETSI documents, and therefore will not be recited here.

GTP-U tunneling is a simple and robust solution to handle the highly mobile user equipment that has a changing location due to mobility. Instead of constantly changing routing tables in routers of the core network for the changing locations of those IP addresses of users, each UE/bearer/QoS data is wrapped in IP packets as PDU, and then wrapped into a GTP-U tunnel whose source and destination IP addresses are those service functions (e.g., base station as one anchor and UPF as the other anchor) at the two end points of the tunnel. This achieves more stable routing tables while the device moves around in the core network.

The control plane of core network assigns each unidirectional GTP-U tunnel a unique Tunnel End ID (TEID). UE 1 has two traffic types with NSSAI=1 and NSSAI=2, UE 2 has two traffic types with NSSAI=1 and NSSAI=2, and UE 3 has two traffic types with NSSAI=2, and NSSAI=3, all together resulting in a total of six tunnels, each with a different tunnel ID, namely TEIDs 1 through 6. NSSAI is a 3GPP-defined descriptor known in prior art that defines up to eight different service types. When NSSAI with a specific value is present in the data packets of a UE, it defines a specific type of service that requires a unique quality of service (QoS) treatment. For example, NSSAI has a field known as Standard Slice Type (SST) having values of SST=1 for enhanced Mobile Broadband, eMB, SST=2 for ultra-reliable and ultra-low delay communications, uRLLC and SST=3 for Massive IOT, mIOT.

According to an aspect of this invention, the gNodeB carries each GTP-U tunnel in a VLAN, depending on the type of service it carries. Three exemplary VLANs are created with tags (or IDs) 10, 20 and 30. NSSAI=1 traffic is placed into VLAN 10, NSSAI=2 traffic is placed into VLAN 20, and NSSAI=3 traffic is placed into VLAN 30 regardless of the identity of the UE. Doing so, a traffic aggregation of the same type and a unique identification at layer 2 are achieved. VLAN 10 (310*a*) carries only one type of traffic while VLAN 20 (310*b*) and VLAN 30 (310*c*) carry a completely different type of traffic that have different QoS requirements.

A unique 'profile' is defined per service type and a unique VLAN tag is mapped onto it according to this invention in the access network, wherein the same VLAN tag is used across RAN and PON components of the access network, VLAN tag basically forms the binding information of data records across RAN and PON. In one embodiment, the VLAN tag is inserted the upstream direction by the base station, and removed by the OLT. In a second embodiment, the VLAN tag is inserted by the base station, and removed by a switching node within the core network. In the first embodiment, the VLAN tags are only meaningful and visible within the access portion of the network, because they are removed before the traffic entering into the aggregation switch. In the second embodiment, the core network performs slicing and routing according to the same VLAN tag. For simplicity, the embodiments here consider only one VLAN tag per GTP-U tunnel group. In prior art, there are other possible embodiments. For example, there may be a VLAN tag used by UE (also known as customer VLAN tag (cVLAN), and an outer VLAN with a VLAN tag known as the service provider VLAN tag (sVLAN). The VLAN tag used in this invention corresponds to the sVLAN tag. However, the invention does not rule out use of cVLAN tags.

FIG. 4A shows the data schema/mapping between profiles, VLAN tags and base stations. A base station may be configured with a plurality of 'profiles' wherein each profile is identified by a Profile ID and has a set of attributes such as upstream and downstream bandwidth, delay and packet loss. Each Profile ID maps into a unique VLAN ID. Each base station supports those VLAN IDs that correspond to the Profile IDs configured on it. gNodeB 100*a* is configured with three profiles, Profile 1, 2 and 3, while gNodeB 100*b* is configured only with Profiles 1 and 3. Both base stations support VLAN 10 and 30. gNodeB 100*b* also supports VLAN 20.

FIG. 4B illustrates the data structures corresponding to the schema of PON. ONU 110*a* and 110*b* must be configured with GEM ports corresponding to the unique VLANs. Since ONU 110*a* is attached to gNodeB 100*a*, and it has to support VLAN 10, 20 and 30 traffic streams. For this reason, three GEM ports are assigned, GEM port 1 is mapped to VLAN 10, GEM port 2 mapped to VLAN 20 and GEM port 3 mapped to VLAN 30. Similarly, since ONU 110*b* is attached to gNodeB 100*b*, and therefore it has to support VLAN 10 and 20 traffic streams, two GEM ports are assigned: GEM port 4 is mapped to VLAN 10 and GEM port 5 mapped to VLAN 20.

Figure 5:
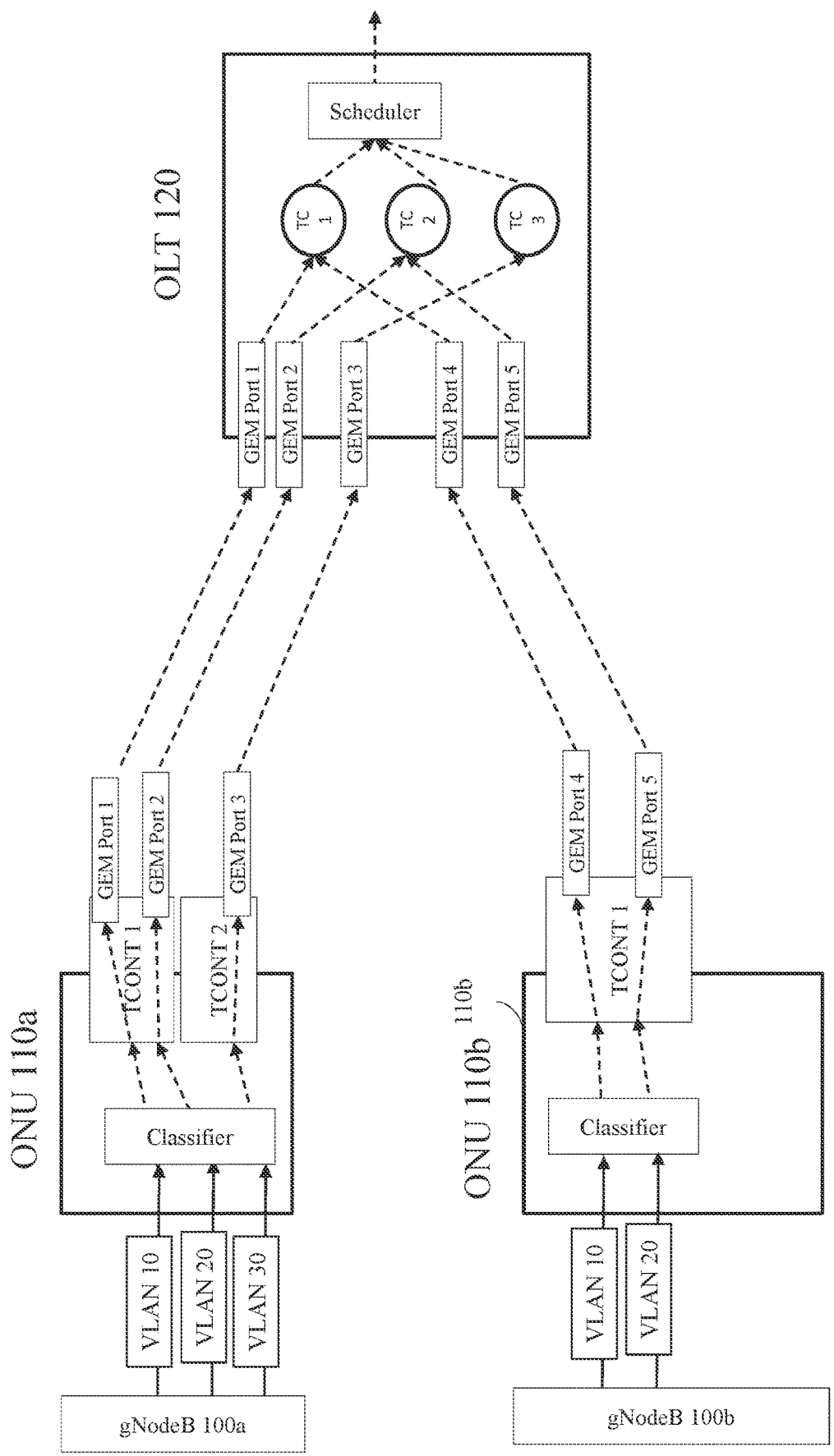
FIG. 5 illustrates the system block diagram showing VLANs and GEM ports.

The mapping between GEM ports and VLANs for the upstream traffic is illustrated in the block diagram of FIG. 5. The traffic classifier in ONU 110*a* and 110*b* grooms traffic according to VLAN tags and sends them in upstream direction towards the corresponding GEM port. Each GEM port performs the GEM encapsulation of the VLAN traffic and forwards packets in the GEM channel towards the GEM port on OLT 120. The received traffic corresponding to VLAN 10, 20 and 30 are processed by different traffic classifiers (e.g., TC 1, 2 and 3) and scheduled for delivery according to the traffic class priorities and upstream bandwidth assignment to that class. A similar process is applicable in the downstream direction wherein the roles are reversed, i.e., the Classifier is in the OLT and the Scheduler is in the ONU.

Figure 6:
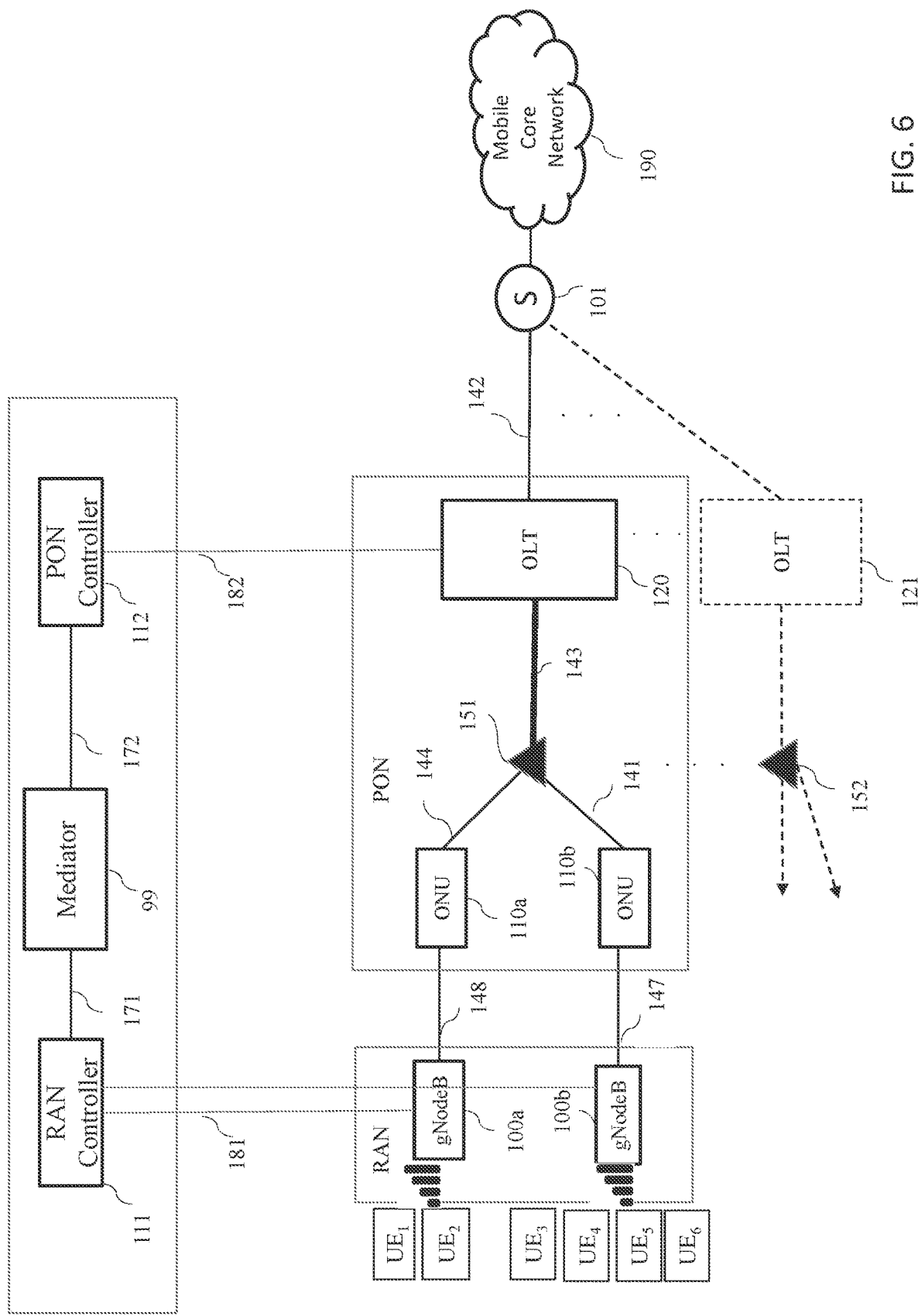
FIG. 6 illustrates the control layer of the $5^{th}$ generation access network with system of the present invention.

FIG. 6 illustrates an exemplary control layer of the access network that comprises RAN controller 111 and PON controller 112, and Mediator 99, which is the system of invention. RAN controller 111 controls gNodeB 100*a* and 100*b* using control interface 181. RAN controller 111 assigns new profiles to each base station, updates the profile attributes or deletes profiles. It also designates mappings from service types to profiles (e.g., using SST values), or from user IDs to profiles (e.g., using user's IMSI), or from applications to profiles (e.g., using DPI methods). The RAN controller's database stores gNodeB Ids, VLAN Ids, Profile Ids, and profile attributes. Similarly, the PON controller 112 controls ONU 110*a* and 110*b* using control interface 182. PON controller assigns new profiles to each OLT/ONU, updates the profile attributes or deletes profiles. It designates GEM port ID to each VLAN ID. The PON controller's database stores ONU and OLT Ids, VLAN Ids, GEM Port Ids, Profile Ids, and profile attributes.

Figure 7:
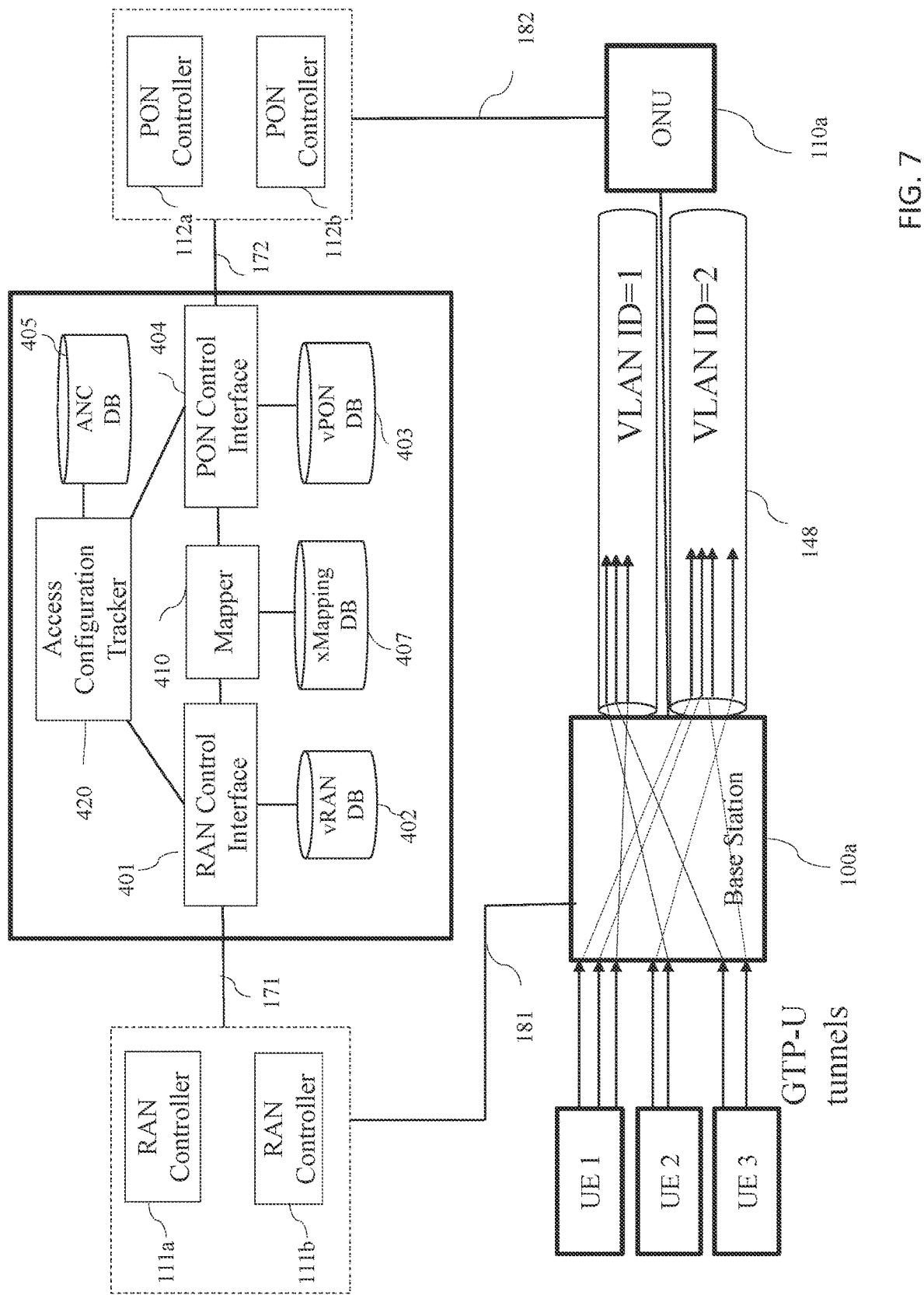
FIG. 7 illustrates the block diagram of system of the present invention.

Mediator 99 is attached to RAN controller 111 with interface 171 and to PON controller 112 with interface 172. These interfaces are used for the Mediator to communicate and mediate between the control layers of these two technologies. An embodiment of Mediator 99 is illustrated in FIG. 7. Access Configuration Tracker 420 collects real-time configuration data about the RAN (gNodeBs) and PON (ONUs and OLTs), and constructs the binding information using a schema stored in Access Network Configuration (ANC) Database (DB) 405. As new gNodeBs (or RRHs and BBUs) are added/deleted, ONUs and OLTs are added/deleted to the network, and new facilities capacity is added/deleted, the ANC Tracker updates the so-called user plane topology data in ANC DB 405 including the IDs of each equipment, their connection to one another, etc. Note that RAN controller and PON controller are unbeknownst to each other's user plane networks without the Mediator.

RAN Control interface 401 communicates with RAN Controller using the RAN Controller's application programming interface (API) 171 available to controller applications. Similarly PON Control interface 404 communicates with PON Controller using the PON Controller's API 172 similar available to controller applications. API 171 and 172 can be a RESTFUL API. Mediator collects and updates data related to slicing of RAN in RAN DB 402. It collects and updates slicing data related to PON in PON DB 403. The data of DB 402 and 403 are correlated in Mapper 410 using the information in ANC DB and stored in Mapping DB 407.

It is paramount that to stitch the slice across access, backhaul and fronthaul, the VLAN ID and Profiles play an important role. RAN and PON components must use exactly the same VLAN tags for the same profile configured in RAN and PON components by their respective controllers. The VLAN tags are determined by the Mapper and communicated to both RAN and PON controllers.

Scenario without use of VLAN tags: In a highly simplified embodiment, all base stations may use only the best effort profile (i.e., no special treatment of the traffic), but may have different upstream and downstream bandwidth needs. In this case, the VLAN tags to identify different profiles are not needed. The user traffic can be carried in GTP-U tunnels without a need for a VLAN at layer 2. Mapper 410 simply translates from each base station's upstream and downstream bandwidth requirements to ONU upstream and downstream capacity requirements in terms of the number GEM ports to be assigned to each ONU, and communicates this information to PON Controller, which in turn communicates it to the OLT.

Figure 8:
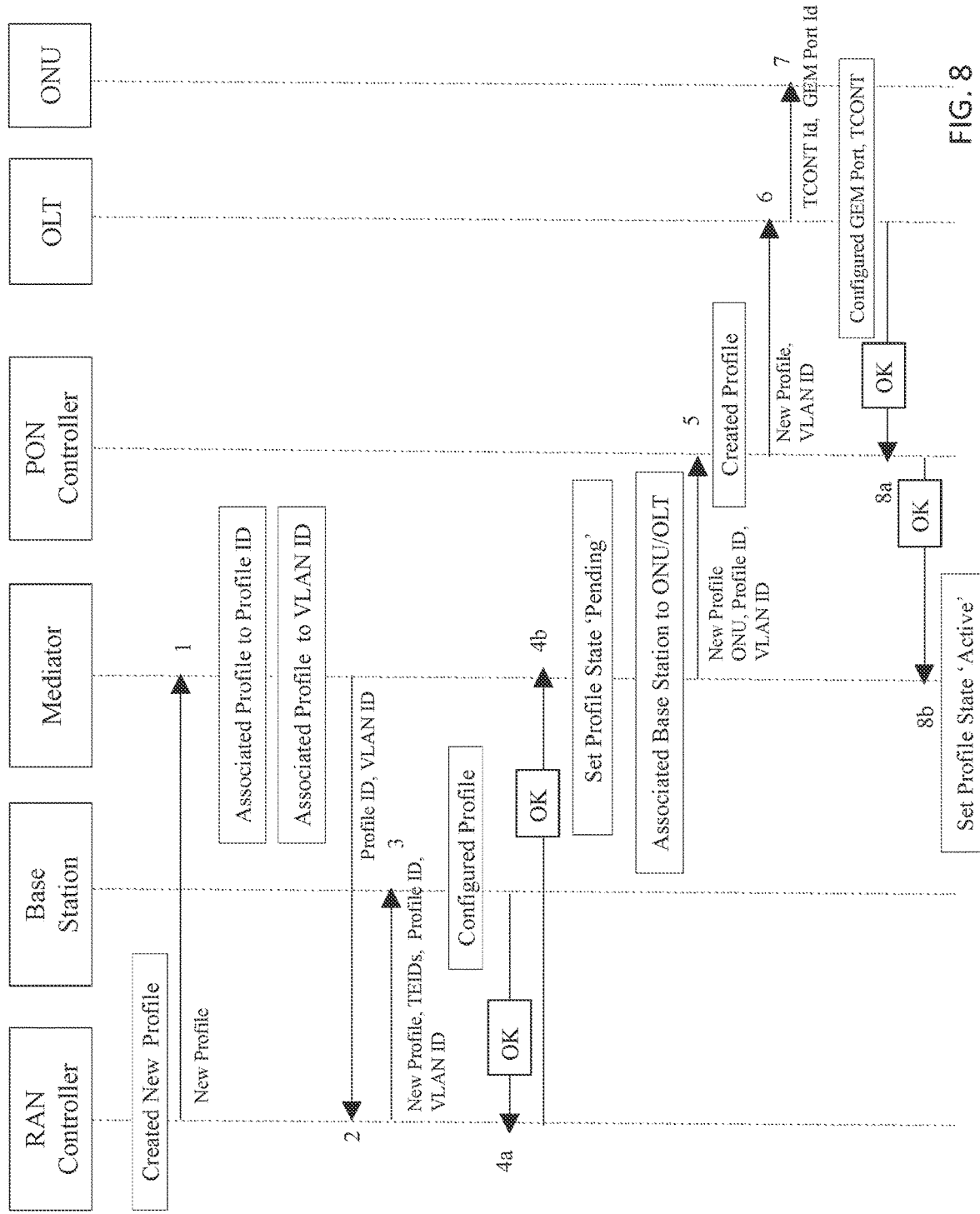
FIG. 8 depicts the messaging diagram for setting up a new profile.
Figure 9:
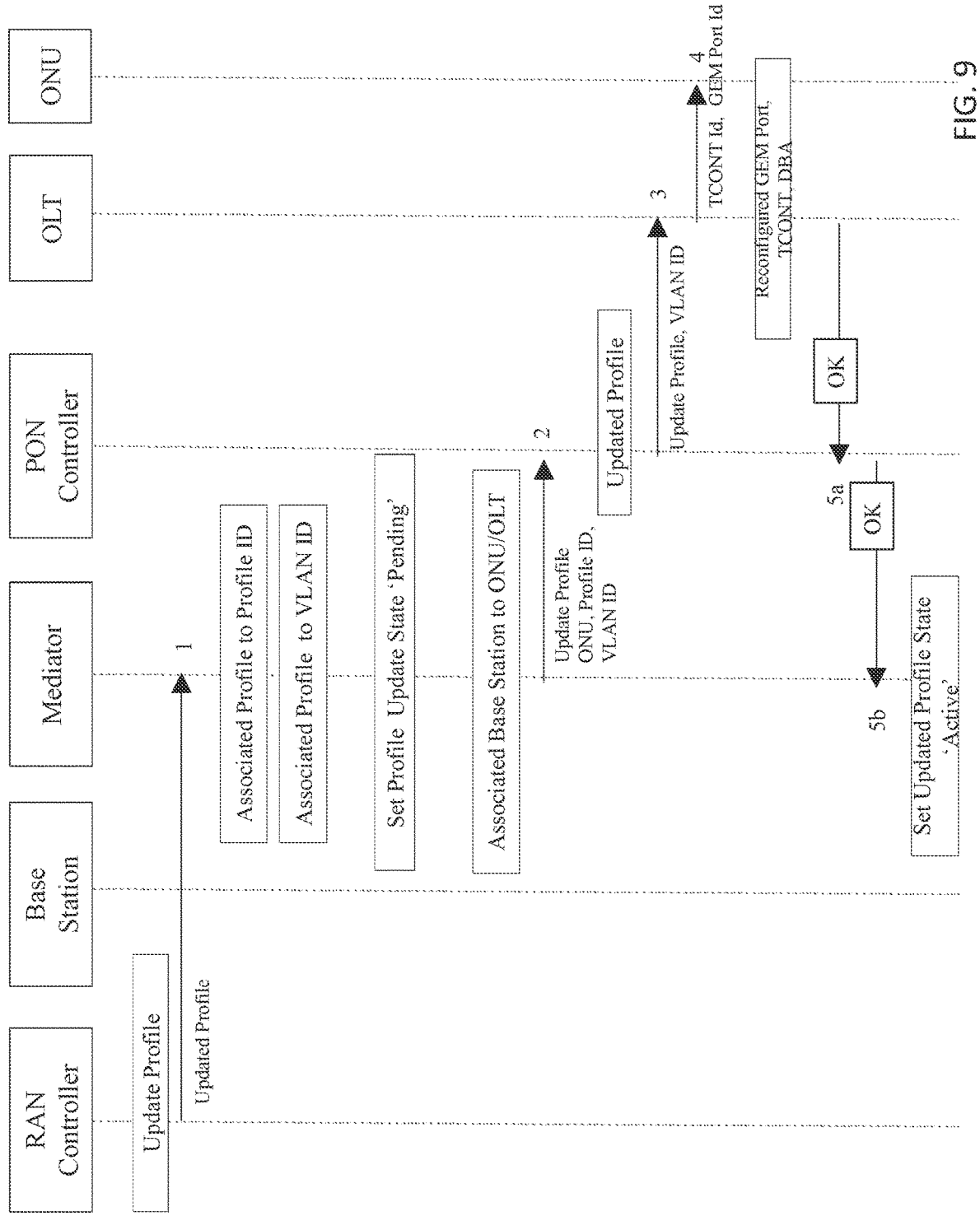
FIG. 9 depicts the messaging diagram for updating an existing profile.

Two messaging scenarios according to an aspect of this invention that use VLAN tags are shown in FIGS. 8 and 9. The first scenario in FIG. 8 is adding a new Profile to the access and backhaul networks in a coordinated fashion using the system of invention. The second scenario in FIG. 9 is modifying an existing Profile in a coordinated fashion using the system of invention. The second scenario arises when a large group of mobile users (or services) move from one base station to another base station, which requires the corresponding Profile information to be updated on both base stations. A new Profile is created within the RAN controller. This new Profile information (including Profile attributes) is communicated to the Mediator in step 1. Mediator determines an ID for the new Profile and assigns an available VLAN tag to the traffic that belongs to this profile. This information is entered into the Mapper DB. The Mediator communicates the Profile ID and corresponding VLAN ID to the RAN Controller in step 2, which then assigns the new Profile along with its attributes, Profile ID and VLAN ID. The RAN Controller also designates the mapping from GTP-U tunnels TEIDs to VLAN IDs in step 3. In turn, base station configures the Profile. Steps 4*a* and 4*b* indicate successful formation of the Profile at the RAN. At this point, the Mediator sets the state of the Profile to Pending, and associates the base station with new Profile to the ONU it is attached to. In step 5, Mediator sends the Profile information along with ONU ID and VLAN ID to PON controller, and in step 6 PON Controller configures the OLT accordingly. In step 7, OLT configures ONU with Profile information, T-CONT ID and Gem Port ID corresponding to VLAN ID. Steps 8*a* and 8*b* indicate success. The Mediator changes the state of the Profile to 'Active' given both RAN and PON are appropriately configured. FIG. 9 illustrates the steps of updating the Profile information, similar to the sequence of steps of FIG. 8. The update of Profile information may take the form of increasing or decreasing the upstream or downstream bandwidth, or changing the security level, or decreasing packet loss, etc.

CONCLUSION

A system and method has been shown in the above embodiments for the effective implementation of an apparatus and method for joint profile-based slicing of mobile access and optical backhaul. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A system attached to a Radio Access Network (RAN) controller and a Passive Optical Network (PON) controller of a mobile network, the RAN controller configuring one or more base stations forming an access subnetwork of the mobile network, and the PON controller configuring one or more optical units forming a backhaul subnetwork of the mobile network, the system comprising:
  (a) a database configured to store:
    (i) topology information associated with connectivity between the one or more base stations forming the access subnetwork and the one or more optical units forming the backhaul subnetwork,
    (ii) a plurality of profiles for respective network slices, each of the plurality of profiles comprising a virtual local area network (VLAN) tag/identifier (ID) assigned to the profile and profile information including a profile ID and one or more attributes obtained from the RAN controller, and
    (iii) for each of the plurality of profiles, a mapping of the profile information onto backhaul subnetwork configuration parameters;
  (b) a connectivity tracker function configured to track in real-time the topology information;
  (c) a mapping function configured to translate, for each of the plurality of profiles, the corresponding profile information obtained from the RAN controller to corresponding backhaul subnetwork configuration parameters of the backhaul subnetwork configuration parameters; and
  (d) an interface function configured to communicate with the RAN controller and to communicate with the PON controller to cause the PON controller to configure the one or more optical units to groom network traffic, based on a VLAN tag/ID of the network traffic, toward an optical port mapped to the VLAN tag/ID in one of the plurality of profiles.

2. The system of claim 1, wherein the mapping function is configured to assign the VLAN tag/ID for each profile of the plurality of profiles from free VLAN tags/IDs.

3. The system of claim 1, wherein the backhaul subnetwork configuration parameters are one or more of gigabit capable passive optical network (GPON) encapsulation method (GEM) port IDs, transmission container (T-CONT) IDs, VLAN tags/IDs, or assigned upstream and downstream bandwidths for the one or more optical units.

4. The system of claim 1, wherein the RAN controller and the PON controller comprise respective Application Programming Interfaces (APIs), and wherein each API of the APIs is one of an OpenFlow API, a P4 API, or a RESTful API.

5. The system of claim 1, wherein the one or more optical units comprise a plurality of Optical Networking Units (ONUs) and Optical Line Termination Units (OLTs), and wherein each of the plurality of ONUs is attached to one of the one or more base stations and to one of the OLTs.

6. The system of claim 1, wherein the access subnetwork of the mobile network is a RAN of a 5G mobile network.

7. The system of claim 1, wherein the one or more attributes comprise one or more of a bandwidth for the network slice, an application type, or a latency.

8. One or more non-transitory computer-readable media comprising instructions to cause one or more processors to:
  receive, from a Radio Access Network (RAN) controller for a RAN of a mobile network, a profile for a network slice that is to include a passive optical network (PON) slice of a PON forming a backhaul subnetwork of the mobile network and a RAN slice of the RAN, the profile comprising a profile ID and one or more attributes for the network slice;
  translate the one or more attributes to backhaul subnetwork configuration parameters; and
  output the backhaul subnetwork configuration parameters to a PON controller for the PON to cause one or more optical units of the PON to groom network traffic for the network slice, based on a virtual local area network (VLAN) tag/identifier (ID) of the network traffic, toward an optical port according to the backhaul subnetwork configuration parameters, wherein the VLAN tag/ID is assigned to the profile.

9. The one or more non-transitory computer-readable media of claim 8, wherein the backhaul subnetwork configuration parameters are one or more of gigabit capable passive optical network (GPON) encapsulation method (GEM) port IDs, transmission container (T-CONT) IDs, VLAN tags/IDs, or assigned upstream and downstream bandwidths for the one or more optical units.

10. The one or more non-transitory computer-readable media of claim 8, wherein the one or more attributes comprises one or more of a bandwidth for the network slice, an application type, or a latency.

11. The one or more non-transitory computer-readable media of claim 8, wherein the instructions cause the one or more processors to:
  assign the VLAN tag/ID to the profile from a set of free VLAN tags/IDs.

12. The one or more non-transitory computer-readable media of claim 8, wherein the RAN controller and the PON controller comprise respective Application Programming Interfaces (APIs), and wherein the instructions cause the one or more processors to communicate the VLAN tag/ID to each of the RAN controller and the PON controller via the respective APIs.

13. The one or more non-transitory computer-readable media of claim 8, wherein the RAN is a RAN of a 5G mobile network.

14. A method comprising:
  receiving, by a system, from a Radio Access Network (RAN) controller for a RAN of a mobile network, a profile for a network slice that is to include a passive optical network (PON) slice of a PON forming a backhaul subnetwork of the mobile network and a RAN slice of the RAN, the profile comprising a profile ID and one or more attributes for the network slice;
  translating, by the system, the one or more attributes to backhaul subnetwork configuration parameters; and
  outputting, by the system, the backhaul subnetwork configuration parameters to a PON controller for the PON to cause one or more optical units of the PON to groom network traffic for the network slice, based on a virtual local area network (VLAN) tag/identifier (ID) of the network traffic, toward an optical port according to the backhaul subnetwork configuration parameters, wherein the VLAN tag/ID is assigned to the profile.

15. The method of claim 14,
wherein the backhaul subnetwork configuration parameters are one or more of gigabit capable passive optical network (GPON) encapsulation method (GEM) port IDs, transmission container (T-CONT) IDs, VLAN tags/IDs, or assigned upstream and downstream bandwidths for the one or more of the optical units.

16. The method of claim 14,
wherein the one or more attributes comprises one or more of a bandwidth for the network slice, an application type, or a latency.

17. The method of claim 14, the method further comprising:
assigning the VLAN tag/ID to the profile from a set of free VLAN tags/IDs.

18. The method of claim 14,
wherein the RAN controller and the PON controller comprise respective Application Programming Interfaces (APIs), the method further comprising:
communicating the VLAN tag/ID to each of the RAN controller and the PON controller via the respective APIs.

19. The method of claim 14,
wherein the RAN is a RAN of a 5G mobile network.

* * * * *